United States Patent
Lin

(10) Patent No.: US 7,533,291 B2
(45) Date of Patent: May 12, 2009

(54) SYSTEM AND METHOD FOR STORING A DATA FILE BACKUP

(75) Inventor: Bor-Chuan Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 222 days.

(21) Appl. No.: 11/309,712

(22) Filed: Sep. 15, 2006

(65) Prior Publication Data
US 2007/0162523 A1    Jul. 12, 2007

(30) Foreign Application Priority Data
Jan. 11, 2006    (CN) .................. 2006 1 0032944

(51) Int. Cl.
*G06F 11/00*    (2006.01)
(52) U.S. Cl. .......................................... 714/6
(58) Field of Classification Search .............. 714/2–4, 714/6–8, 13, 15, 16, 18, 20, 21, 32, 37
See application file for complete search history.

(56) References Cited

U.S. PATENT DOCUMENTS

| 5,506,983 | A |  | 4/1996 | Atkinson et al. |
| 6,175,904 | B1 | * | 1/2001 | Gunderson .................. 711/162 |
| 6,505,216 | B1 | * | 1/2003 | Schutzman et al. ......... 707/204 |
| 7,055,008 | B2 | * | 5/2006 | Niles et al. .................. 711/162 |
| 2003/0126247 | A1 | * | 7/2003 | Strasser et al. ............. 709/223 |
| 2005/0108484 | A1 | * | 5/2005 | Park .......................... 711/162 |
| 2007/0038913 | A1 | * | 2/2007 | Allen et al. ................. 714/758 |

* cited by examiner

*Primary Examiner*—Nadeem Iqbal
(74) *Attorney, Agent, or Firm*—Wei Te Chung

(57) ABSTRACT

A method for storing a data file copy is provided. The method includes the steps of: (a) dividing a duplicate of a data file stored in a mother node into a plurality of data pieces and storing each data piece in a child node of the mother node; (b) determining whether the data file in the mother node is destroyed when accessed by a user; and (c) merging all the data pieces stored in the child nodes to rebuild the data file, if the data file is destroyed. A related system is also disclosed.

8 Claims, 4 Drawing Sheets

SYSTEM AND METHOD FOR STORING A DATA FILE BACKUP

FIELD OF THE INVENTION

The present invention relates to systems and methods for data storage, and more particularly, to a system and method for accessing data files.

DESCRIPTION OF RELATED ART

An application programming interface (API) is a series of functions that programs calls to allow data to be exchanged without directly accessing the application that provides the APIs. For instance, a computer program can (and often must) use its operating system's API to allocate memory and access files.

A cyclic redundancy checksum (CRC) is a type of hash function used to produce a checksum value from a large block of data, such as a computer program or a computer file, in order to detect errors during transmission or storage of the data. An original CRC checksum value is computed before transmission or storage of the data, and a current CRC checksum is computed and compared to the original CRC checksum when the data is accessed afterwards, in order to confirm that no changes occur.

Presently, information transmission and storage often depends on computer systems, a familiar and most common means for storing data information is: storing a data file in a storage such as a hard disk of a computer. In order to protect the integrity of the data file, many kinds of methods are adopted, such as password settings to allow only authorized users to access the data file, or a writing protection mechanism to prohibit writing operation to the data file from users, or keeping a whole backup of the data file. However, because all the data are stored in the same storage space, if an outside force attacks the data file, such as a virus attacks the data file, or an authorized user deletes the data file cursorily, password settings and writing protection are of no use, and the same risk can also happen to the whole backup of the data file. As a result, a recovery of the data file is very difficult, especially when the data file is very big.

What is needed, therefore, is a system and method for storing a data file backup at multiple locations, therefore if a data file in a node is destroyed, data pieces in the different child nodes of the node can be obtained to rebuild the data file, so as to overcome the risk of storing a whole data file in one node.

SUMMARY OF THE INVENTION

A system for storing a data file backup in accordance with a preferred embodiment is provided. The system includes at least one server. The server includes a data file accessing module, for dividing a duplicate of a data file stored in a mother node into a plurality of data pieces, storing the data pieces into a plurality of child nodes of the mother node, and merging the data pieces in the child nodes to rebuild the data file in the mother node when the data file is destroyed.

Another preferred embodiment provides a method for storing a data file backup. The method includes the steps of: (a) dividing a duplicate of a data file stored in a mother node into a plurality of data pieces and storing each data piece in a corresponding child node of the mother node; (b) determining whether the data file in the mother node is destroyed when accessed by a user; and (c) merging all the data pieces stored in the child nodes to rebuild the data file, if the data file is destroyed.

Other advantages and novel features of the embodiments will be drawn from the following detailed description with reference to the attached drawings.

DETAILED DESCRIPTION OF THE INVENTION

Figure 1:
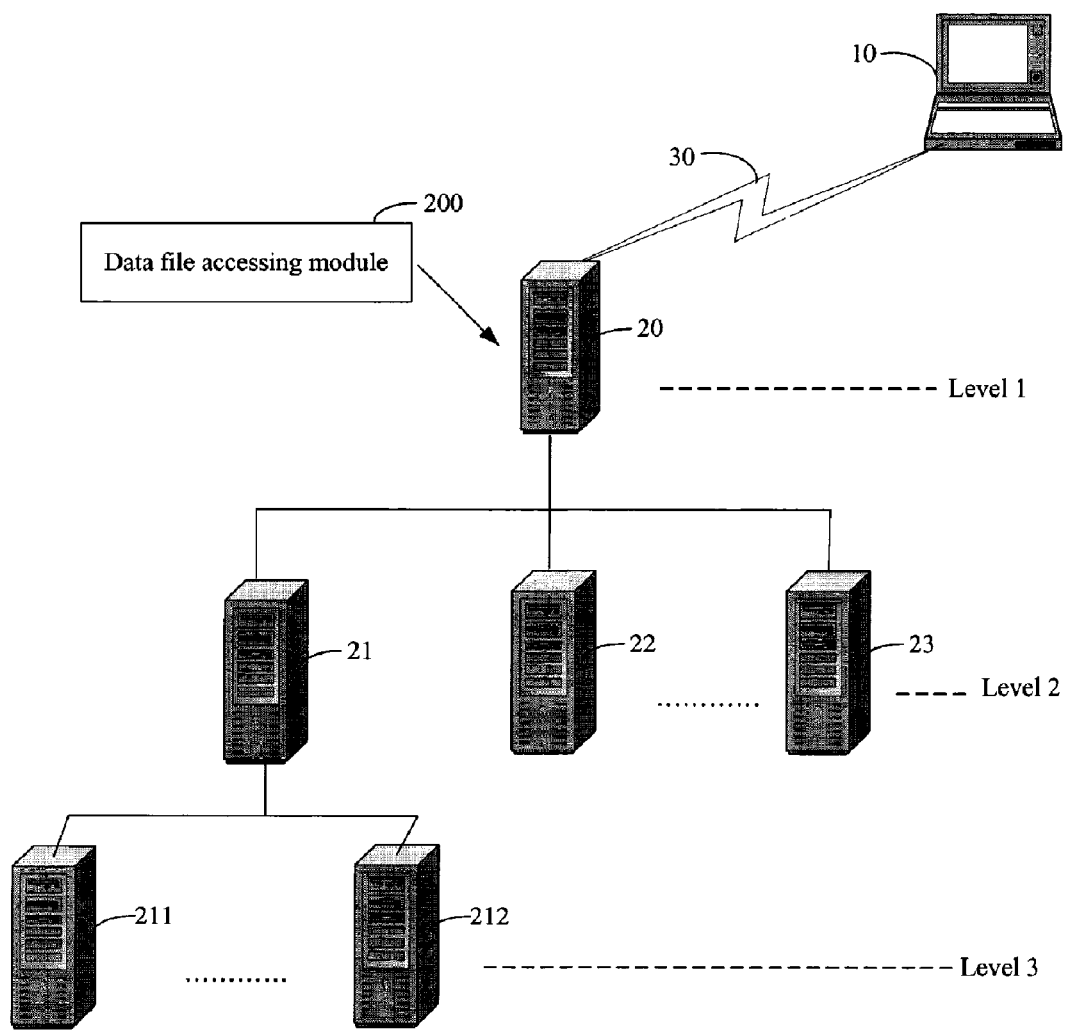
FIG. 1 is a schematic diagram illustrating a system for storing a data file backup according to a preferred embodiment.

FIG. 1 is a schematic diagram illustrating a system for storing a data file backup according to a preferred embodiment. The system may include: a client computer 10, a network 30, and a plurality of servers. In this preferred embodiment, the servers form a tree data structure, in which each server is regarded as a node at different levels. For example, the server 20 can be a root node at level 1 which has three child nodes at level 2, server 21, server 22, and server 23. The server 21 further has two child nodes at level 3, server 211 and server 212. Furthermore, the server 20 is also said to be a parent node of server 21, server 22, and server 23; server 21 is also said to be the parent node of server 211 and server 212. The client computer 10 accesses data files from the server 20 through the network 30. In other embodiments, the nodes may be located at different storage spaces within a single server instead.

Each server has a data file accessing module 200 and each node has a configuration file. The configuration file specifies identification and an address of each child node.

The data file accessing module 200 is used for storing a data file sent from the client computer 10 or the parent node, creates a data file copy of the data file, divides the data file copy into a plurality of data pieces, and transmit each data piece as a data file to the child node based on the configuration file correspondingly. In general, the data file copy is divided into the number of the child nodes, which means in the preferred embodiment, the data file copy in the server 20 (the root node) is divided into three data pieces, and each data piece is transmitted to the servers 21, 22, and 23 as data files correspondingly.

The data file accessing module 200 corresponding to each child node continues the procedure until a data piece reaches a leaf node (i.e., a node without any child nodes). For example, in the preferred embodiment, the data file accessing module 200 in each child node (e.g. server 21) further divides a data file copy (corresponding a data piece of the parent node) stored therein into data pieces according to its child nodes (e.g. servers 211 and 212), and stores each data piece in each of its child nodes correspondingly.

The data file accessing module 200 is further used for recovering a corrupted or deleted data file in a node by merging the data pieces from each child node of the node, and replacing the corrupted or the deleted data file in the node with the data piece merged. If the data file in the root node (e.g. server 20) is destroyed, the data file accessing module 200 merges all the data pieces in the child nodes (e.g. servers 21, 22 and 23) to rebuild the data file. Similarly, if the data file in the server 21 is destroyed, the data file accessing module 200 thereof merges all the data pieces in its child nodes (e.g. servers 211 and 212) to rebuild the data file in the server 21.

Figure 2:
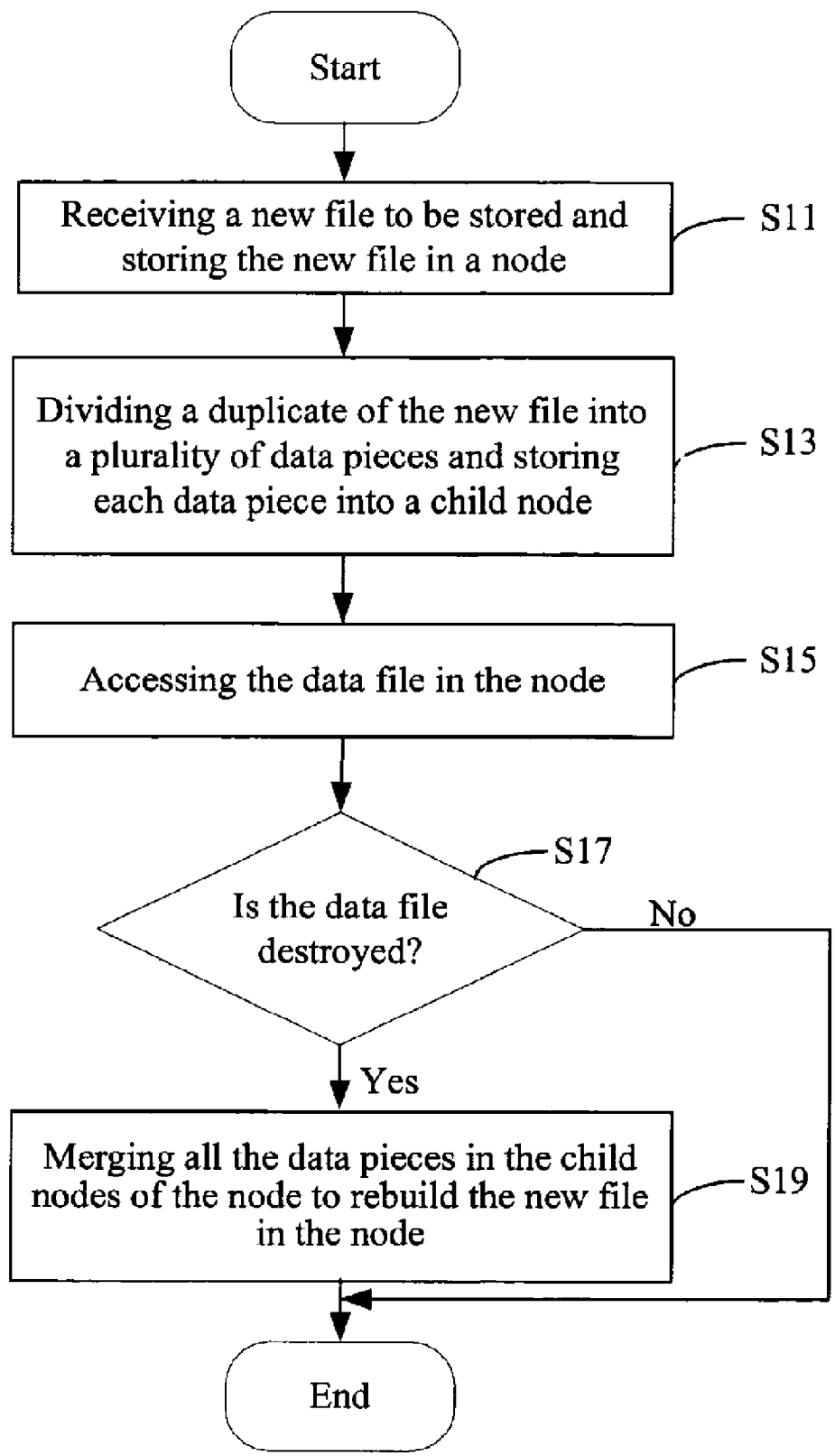
FIG. 2 is a flowchart of a preferred method for storing a data file backup by utilizing the system of FIG. 1.

FIG. 2 is a flowchart of a preferred method for storing a data file backup. In step S11, the data file accessing module 200 receives a new file to be stored and stores the new file in the server 20. In step S13, the data file accessing module 200 creates a new file copy on the server 20, divides the new file copy into a plurality of data pieces, and transmit each data piece to a child node (detailed description is given in FIG. 3).

In step S15, the client computer 10 sends a request of accessing the new file stored on the server 20. In step S17, the data file accessing module 200 detects whether the new file in the server 20 is destroyed or corrupted by comparing a current initial CRC32 checksum of the new file with an initial CR32 checksum of the new file. If the two checksum does not equal, this indicates that the new file in the server 20 is destroyed or corrupted, in step S19, the data file accessing module 200 merges all data pieces in the child nodes of the server 20 to rebuild the new file (detailed description is given in FIG. 4), and sends the new file rebuilt to the client computer 10 through the network 30.

In step S17, if the data file accessing module 200 detects that the new file in the server 20 is intact, the data file accessing module 20 sends the new file to the client computer 10 through the network 30, the procedure ends.

Figure 3:
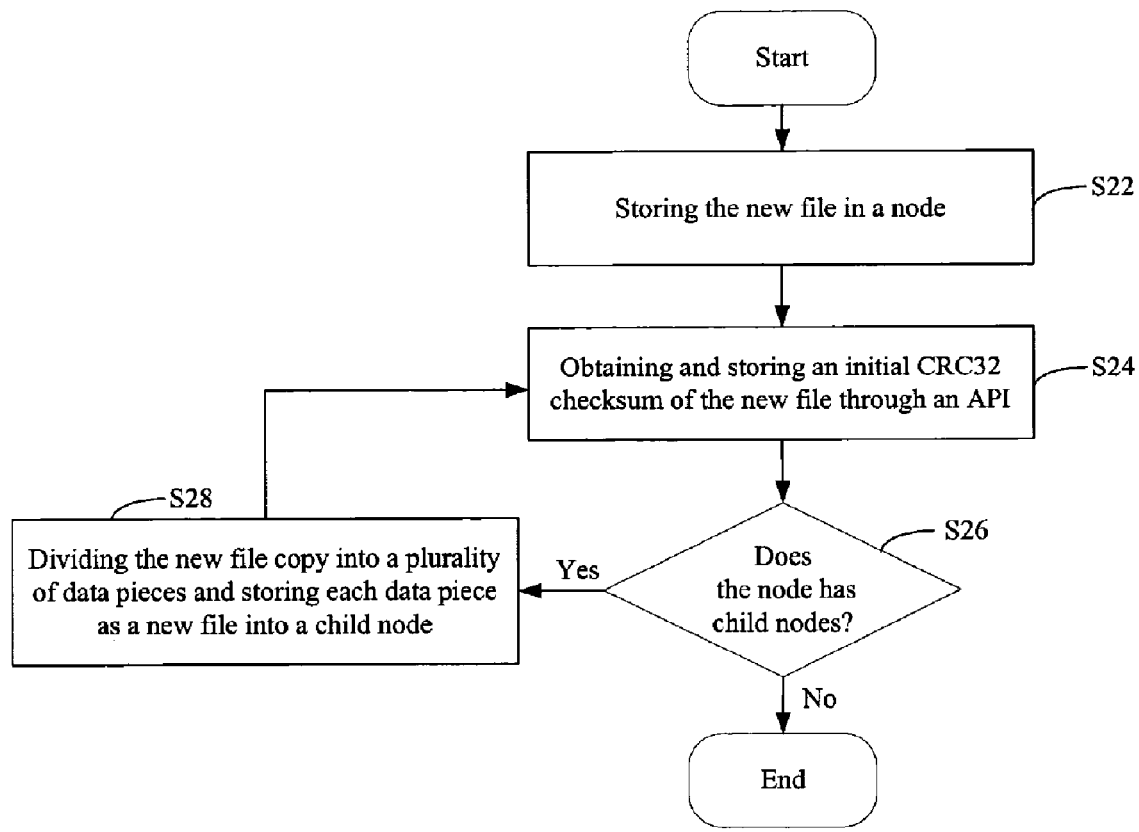
FIG. 3 is a detailed description of one step in FIG. 2, namely dividing a duplicate of the data file into several data pieces and storing each data piece in a corresponding child node.

FIG. 3 is a detailed description of step S13 in FIG. 2. In step S22, the data file accessing module 200 stores the new file in the server 20. In step S24, the data file accessing module 200 obtains the initial CRC32 checksum of the new file through an application programming interface (API), and stores the initial CRC32 checksum in a storage of the server 20. In step S26, the data file accessing module 200 analyzes whether the node (server 20) has child nodes based on the node's configuration file that specifies identification and an address of each child node. If the server 20 has child nodes, i.e., servers 21, 22, and 23, then in step S28, the data file accessing module 200 divides the new file copy into three data pieces A1, A2 and A3, and transmits the data pieces A1, A2, and A3 into the servers 21, 22, and 23 respectively. For each data piece sent to each child node of the server 20, the data file accessing module 200 corresponding to each child node receives the data piece as a new file and performs step S22 to step S28. For example, the data file accessing module 200 in the server 21 divides the data piece A1 into data pieces A11 and A12, and transmits the data pieces A11 and A12 into the servers 211 and 212 respectively.

In step S26, if the data accessing module 200 determines the server 20 has no child nodes, the procedure ends.

Figure 4:
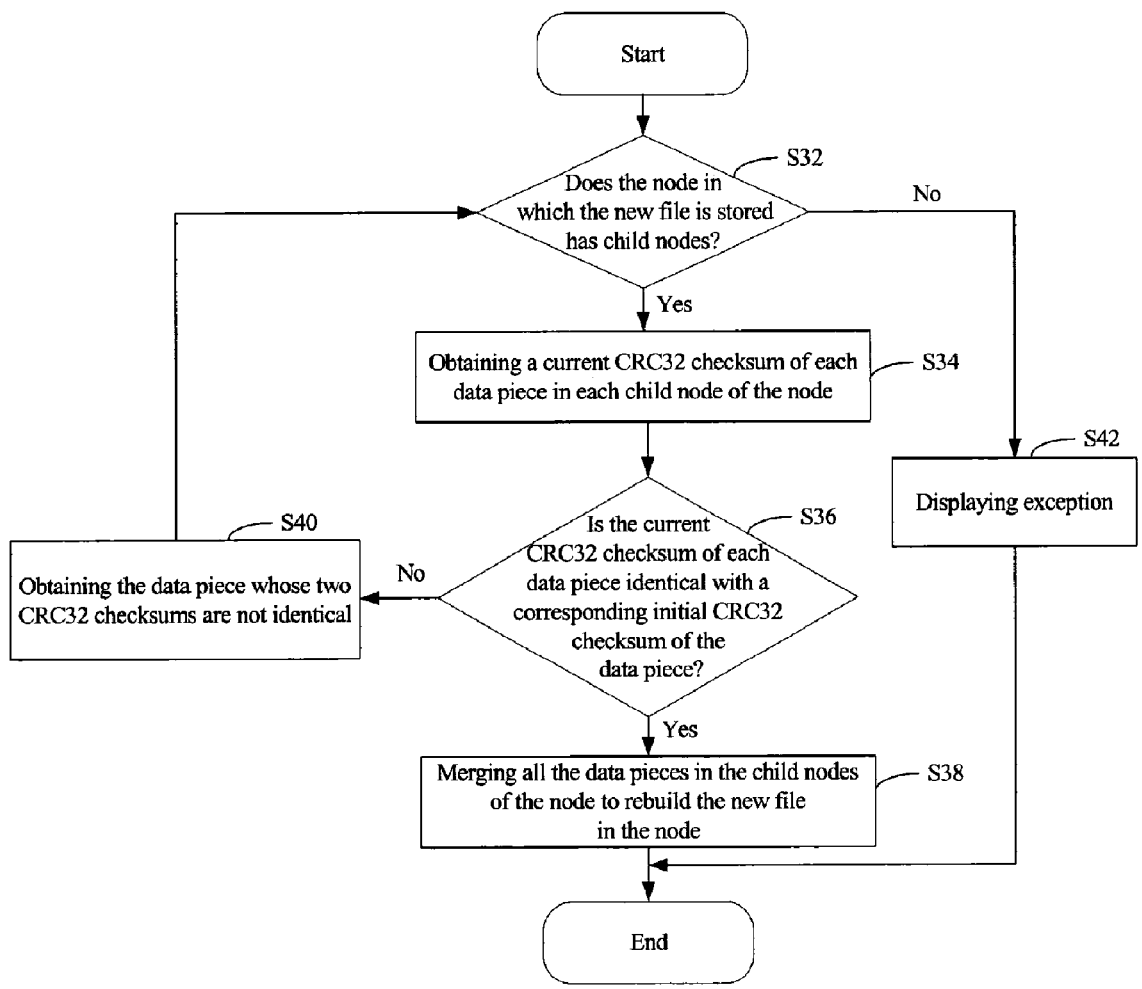
FIG. 4 is a detailed description of another step in FIG. 2, namely merging all the data pieces stored in the child nodes to rebuild the data file in the root node.

FIG. 4 is a detailed description of step S19 in FIG. 2. If the new file stored in server 20 is destroyed or corrupted, in step S32, the data file accessing module 200 analyzes whether the corrupted node (server 20) has child nodes based on the configuration file of the corrupted node (server 20). If the server 20 has child nodes, such as the servers 21, 22, and 23, in step S34, the data file accessing module 200 corresponding to the corrupted node obtains a current CRC32 checksum of each data piece in each child node through the API, for example, the current CRC32 checksum of the data piece A1 in the server 21, the current CRC32 checksum of the data piece A2 in the server 22, and the current CRC32 checksum of the data piece A3 in the server 23. In step S36, the data file accessing module 200 compares the current CRC32 checksum of each data piece with a corresponding initial CRC32 checksum of the data piece, and determines whether the current CRC32 checksum is identical with the initial CRC32 checksum. If the two CRC32 checksums of each data piece are identical, indicating that the data pieces are intact, in step S38, the data file accessing module 200 merges the data pieces of the child nodes to rebuild the destroyed/corrupted new file in the server 20. In this preferred embodiment, the data file accessing module 200 obtains and merges the data pieces A1, A2, and A3 to rebuild the destroyed new file in the server 20. If the current CRC32 checksum of any data piece in a child node is different from the initial CRC32 checksum of the data piece in the child node, in step S40, the data file accessing module 200 obtains the data piece whose two CRC32 checksums are not identical, such as the data piece A1, and repeats from step S32 to the data piece A1 in order to rebuild the data piece A1.

In step S32, if the data file accessing module 200 corresponding to the corrupted node determines that the corrupted node is a leaf node (i.e., does not have any child nodes), in step S42, the data file accessing module 200 displays an exception through the API to remind the client computer 10 of processing the data file or the data piece by other means.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for storing a data file backup, the system comprising at least one server, the server comprising a configuration file and a data file accessing module, wherein the configuration file specifies identification and addresses of child nodes of the server, the data file accessing module is configured for dividing a duplicate of a data file stored in the server into a plurality of data pieces, storing the data pieces into the child nodes, and merging the data pieces in the child nodes according to the configuration file, so as to rebuild the data file upon the condition that the data file has been destroyed.

2. The system as claimed in claim 1, wherein the child nodes are different storage spaces in the server.

3. The system as claimed in claim 1, wherein the child nodes are different storage spaces in different servers.

4. A computer-based method for storing a data file backup, comprising the steps of:
   dividing a duplicate of a data file stored in a mother node into a plurality of data pieces and storing each of the data pieces in a corresponding child node of the mother node according to a configuration file of the mother node, wherein the configuration file specifies identification and addresses of the child nodes of the mother node;
   determining whether the data file in the mother node has been destroyed when accessed by a user; and
   merging all the data pieces stored in the child nodes to rebuild the data file according to the configuration file, upon the condition that the data file has been destroyed.

5. The method as claimed in claim 4, wherein the dividing and storing step comprises the steps of:
   (a) storing the data file in the mother node through an application programming interface;
   (b) obtaining an initial checksum of the data file through the application programming interface;
   (c) determining whether the mother node has child nodes;
   (d) dividing a duplicate of the data file into a plurality of data pieces, if the mother node has child nodes;
   (e) storing each data piece in a corresponding child node through the application interface; and
   (f) repeating the steps (b) to (e) to each child node.

6. The method as claimed in claim 5, wherein the merging step comprises the steps of:
- (j) determining whether the mother node in which the data file is stored has child nodes;
- (k) obtaining a current checksum of each data piece in each child node through the application programming interface, if the mother node has child nodes;
- (l) determining whether the current checksum of each data piece is identical with a corresponding initial checksum of the data piece; and
- (m) merging all the data pieces to rebuild the destroyed data file, if the current checksum of each data piece is identical with its initial checksum.

7. The method as claimed in claim 6, wherein the merging step further comprises the step of:
   returning to the step (j), if the current checksum of any data piece is different from its initial checksum.

8. The method as claimed in claim 6, further comprising the step of:
   displaying exception through the application programming interface, if the mother node in which the data file is stored has no child nodes.

* * * * *